Patented Nov. 15, 1949

2,488,497

UNITED STATES PATENT OFFICE 2,488,497

1,4-DI(ARYLOXY)-2-BUTENES

Clarence L. Moyle, Clare, Mich., assignor to The Dow Chemical Company, Midland, Mich., a corporation of Delaware No Drawing. Application September 13, 1948, Serial No. 49,131

4 Claims. (Cl. 260—613)

This invention is directed to 1,4-di(aryloxy)-2-butenes having the formula

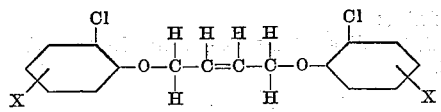

wherein X is butyl or phenyl.

The new compounds may be prepared by reacting 1,4-dibromo-2-butene having the formula

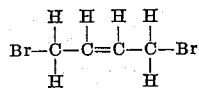

with an alkali metal salt of 2-chlorophenol further substituted with normalbutyl, isobutyl, secondarybutyl, tertiarybutyl or phenyl. The reaction may be carried out in an inert organic solvent and in the presence of a small amount of water, if desired. Satisfactory yields are obtained in preparations employing two molecular proportions of the phenolate and one molecular proportion of 1,4-dibromo-2-butene. The reaction has been found to take place at a temperature of between 30° and 100° C.

In a representative operation, 2 mols of sodium hydroxide is reacted with 2 mols of the desired phenol in methyl alcohol and a small amount of water to form a solution of the corresponding phenolate. One mol of 1,4-dibromo-2-butene is added portionwise to the above solution and the resulting mixture warmed for a short time at a temperature of from 40° to 80° C. to complete the reaction. The crude reaction product is then dispersed in a non-reactive water-immiscible organic solvent, such as benzene or methylene dichloride, and the resulting mixture successively washed with dilute aqueous potassium or sodium hydroxide and water, and dried over silica gel. The solvent is removed by evaporation to obtain the 1,4-di(aryloxy)-2-butene.

1,4-dibromo-2-butene employed as a starting material is readily prepared by dissolving 1,3-butadiene in ethylene dichloride and reacting this solution with bromine at low temperatures. The desired product of reaction is obtained from the crude reaction mixture by conventional methods of purification, such as fractional distillation and fractional crystallization, and has a melting point of 53° C.

The following examples illustrate the invention but are not to be construed a limiting.

*Example 1.—1,4-di(6-secondarybutyl-2-chlorophenoxy)-2-butene*

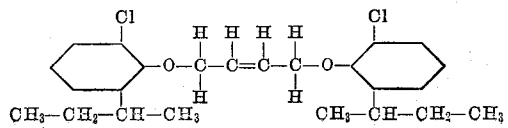

8.0 grams (0.2 mol) of sodium hydroxide and 36.9 grams (0.2 mol) of 6-secondarybutyl-2-chlorophenol were mixed together in 56 grams of methyl alcohol and 6 grams of water to produce an alcoholic phenolate solution. 21.4 grams (0.1 mol) of 1,4-dibromo-2-butene was added portionwise to this solution and the resulting mixture warmed for 1 hour at 50° to 60° C. to complete the reaction. The crude reaction product was dispersed in dilute aqueous sodium hydroxide, the resultant mixture separating into aqueous and oil layers. The latter was separated, washed with water, and dried over silica gel to obtain 1,4-di(6-secondarybutyl-2-chlorophenoxy)-2-butene as a straw colored oil having a density of 1.17 at 27° C.

*Example 2*

4.8 grams (0.12 mol) of sodium hydroxide was reacted with 22.1 grams (0.12 mol) of 4-secondarybutyl-2-chlorophenol in 32 grams of methyl alcohol and 3 grams of water to form the sodium salt of the phenol. 12.85 grams (0.06 mol) of 1,4-dibromo-2-butene was added portionwise to this solution and the resulting mixture warmed for 15 minutes at 50° to 60° C. to complete the reaction. The crude product was dispersed in methylene dichloride and the resultant mixture successively washed with dilute aqueous potassium hydroxide and water, and dried. The solvent was then removed by evaporation to obtain 1,4-di(4-secondarybutyl-2-chlorophenoxy)-2-butene as a yellow oil having a density of 1.16 at 26° C.

*Example 3*

8.7 grams (0.217 mol) of sodium hydroxide and 40 grams (0.217 mol) of 4-tertiarybutyl-2-chlorophenol were reacted in 60 grams of methyl alcohol and 6 grams of water. 23 grams (0.108 mol) of 1,4-dibromo-2-butene was added portionwise to this solution and the resulting mixture warmed for 30 minutes at 50° to 60° C. to complete the reaction. The crude product was dispersed in methylene dichloride and the resultant mixture successively washed with dilute aqueous sodium hydroxide and water, and dried. The solvent was then removed by evaporation to obtain 1,4-di(4-tertiarybutyl-2-chlorophenoxy)-2-butene. The latter was a yellow oil having a density of 1.16 at 25° C.

*Example 4*

8.0 grams (0.2 mol) of sodium, 40.9 grams (0.2 mol) of 6-phenyl-2-chlorophenol and 21.4 grams (0.1 mol) of 1,4-dibromo-2-butene were reacted as described in Example 1 to obtain 1,4-di(6-phenyl-2-chlorophenoxy)-2-butene as an oily liquid having a density of 1.29 at 27° C.

In a similar manner other 1,4-di(aryloxy)-2-butenes may be prepared as follows:

1,4-di(4-normalbutyl-2-chlorophenoxy)-2-butene by reacting sodium 4-normalbutyl-2-chlorophenolate with 1,4-dibromo-2-butene.

1,4-di(4-phenyl-2-chlorophenoxy)-2-butene by reacting sodium 4-phenyl-2-chlorophenolate with 1,4-dibromo-2-butene.

The new 1,4-di(aryloxy)-2-butenes are oily liquids, substantially insoluble in water, somewhat soluble in many organic solvents, not appreciably affected by carbon dioxide and non-corrosive to the skin of man and higher animals. They are valuable as modifying agents in plastic compositions and as constituents of insecticide compositions.

For insecticidal use, the compounds may be dispersed in a finely-divided solid and employed as an agricultural dust. They may also be dispersed in water with or without the addition of emulsifying, wetting or dispersing agents and the dispersion applied in the form of a spray. In other procedures, the compounds may be incorporated in oils or as constituents of oil-in-water emulsions.

In one operation, concentrates were prepared by mixing together 25 parts by weight of toxicant, 10 parts of the dioctyl ester of sodium sulfosuccinic acid (a commercial wetting and emulsifying agent known as Aerosol Ot) and 65 parts of xylene. The concentrates were then dispersed in water to form spray compositions containing various amounts of toxicants per 100 gallons. Representative controls obtained with these sprays are set forth in the following table:

| Toxicant | Organism | Pounds of Toxicant Per 100 Gallons | Percentage Control |
|---|---|---|---|
| 1,4-di(6-secondary-butyl-2-chlorophenoxy)-2-butane | Two-spotted spider mite | 1.00 | 88 |
|  | Bean aphid | 0.50 | 100 |
| 1,4-di(4-secondary-butyl-2-chlorophenoxy)-2-butene | Two-spotted spider mite | 0.50 | 99 |
|  | Bean aphid | 0.50 | 100 |
| 1,4-di(6-phenyl-2-chlorophenoxy)-2-butene | Two-spotted spider mite | 1.00 | 88 |
|  | Bean aphid | 1.00 | 100 |

I claim:

1. A 1,4-di(aryloxy)-2-butene having the formula

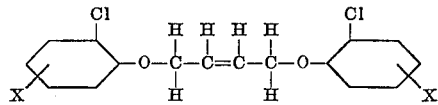

wherein X is selected from the group consisting of the phenyl and butyl radicals.

2. 1,4-di(2-secondarybutyl-6-chlorophenoxy)-2-butene.

3. 1,4-di(4-secondarybutyl-2-chlorophenoxy)-2-butene.

4. 1,4-di(6-phenyl-2-chlorophenoxy)-2-butene.

CLARENCE L. MOYLE.

No references cited.